US008028179B2

(12) United States Patent  (10) Patent No.: US 8,028,179 B2
Zettler  (45) Date of Patent: Sep. 27, 2011

(54) DETERMINING EXPECTED EXCEEDING OF MAXIMUM ALLOWED POWER CONSUMPTION OF A MOBILE ELECTRONIC DEVICE

(75) Inventor: Thomas Zettler, Hoehenkirchen-Siegertsbrunn (DE)

(73) Assignee: Infineon Technologies AG, Neubiberg (DE)

( * ) Notice: Subject to any disclaimer, the term of this patent is extended or adjusted under 35 U.S.C. 154(b) by 1013 days.

(21) Appl. No.: 11/853,164

(22) Filed: Sep. 11, 2007

(65) Prior Publication Data

US 2008/0082851 A1  Apr. 3, 2008

(30) Foreign Application Priority Data

Sep. 29, 2006  (DE) .......................... 10 2006 046 184

(51) Int. Cl.
*G06F 1/00* (2006.01)
*G06F 1/32* (2006.01)
*G06F 11/00* (2006.01)
*G06F 9/46* (2006.01)

(52) U.S. Cl. ........ 713/320; 713/300; 713/340; 718/100; 718/102; 718/104

(58) Field of Classification Search .................. 713/300, 713/320, 340; 718/100, 102, 104
See application file for complete search history.

(56) References Cited

U.S. PATENT DOCUMENTS

| 4,670,837 | A  | * | 6/1987  | Sheets ........................... 713/501 |
| 5,339,445 | A  |   | 8/1994  | Gasztonyi |
| 6,101,611 | A  | * | 8/2000  | Yoshida ......................... 713/340 |
| 6,108,683 | A  | * | 8/2000  | Kamada et al. ................ 718/103 |
| 6,477,388 | B1 | * | 11/2002 | Schmutz ........................ 455/522 |
| 7,036,034 | B2 | * | 4/2006  | Kobayashi et al. ........... 713/340 |
| 7,203,943 | B2 | * | 4/2007  | Shaffer .......................... 718/104 |
| 7,260,728 | B2 | * | 8/2007  | Chang et al. .................. 713/300 |
| 7,337,433 | B2 | * | 2/2008  | Cyran et al. ................... 717/130 |
| 7,430,675 | B2 | * | 9/2008  | Lee ................................. 713/320 |
| 7,539,991 | B2 | * | 5/2009  | Leong et al. ................... 718/102 |
| 7,581,125 | B2 | * | 8/2009  | Ranganathan et al. ........ 713/320 |
| 7,774,630 | B2 | * | 8/2010  | Hatasaki et al. ............... 713/320 |
| 2002/0194511 | A1 | * | 12/2002 | Swoboda ....................... 713/300 |
| 2003/0123331 | A1 |   | 7/2003  | Poisner |
| 2005/0044429 | A1 |   | 2/2005  | Gaskins |
| 2005/0125701 | A1 | * | 6/2005  | Hensbergen et al. ......... 713/320 |
| 2005/0272402 | A1 | * | 12/2005 | Ferentz et al. ................ 455/402 |

(Continued)

FOREIGN PATENT DOCUMENTS

| EP | 0 868 093 A1 | 9/1998 |
| EP | 1 378 816 A1 | 1/2004 |

*Primary Examiner* — Ji H Bae (74) *Attorney, Agent, or Firm* — Dickstein Shapiro LLP (57) ABSTRACT

Apparatus and method for determining an expected exceeding of a maximum allowed power consumption of a mobile electronic device is provided, wherein the method includes determining power consumption of the device in a current operating state, determining, for a first process executable by a processor of the device, process-specific power consumption of the device which would be caused by execution of the first process, determining as to whether an expected exceeding of a maximum allowed power consumption would occur for a case in which a new instance of the first executable process would be executed, which is currently not executed, and that possible present instances of the first executable process, which are currently executed, are continued to be executed, and if it has been determined that an expected exceeding of a maximum allowed power consumption would occur, outputting information about the expected exceeding of the maximum allowed power consumption.

25 Claims, 4 Drawing Sheets

U.S. PATENT DOCUMENTS

| | | |
|---|---|---|
| 2005/0289360 A1 | 12/2005 | Banginwar et al. |
| 2006/0005057 A1 | 1/2006 | Nalawadi |
| 2006/0112286 A1* | 5/2006 | Whalley et al. ............... 713/300 |
| 2007/0011473 A1* | 1/2007 | Sung ............................. 713/300 |
| 2008/0052546 A1* | 2/2008 | Schindler et al. ............. 713/300 |
| 2010/0048139 A1* | 2/2010 | Seo et al. .................... 455/67.11 |

* cited by examiner

DETERMINING EXPECTED EXCEEDING OF MAXIMUM ALLOWED POWER CONSUMPTION OF A MOBILE ELECTRONIC DEVICE

CROSS-REFERENCE TO RELATED APPLICATION

This application claims priority to German Patent Application Serial No. 10 2006 046 184.3, which was filed Sep. 29, 2006, and is incorporated herein by reference in its entirety.

TECHNICAL FIELD

Embodiments of the present invention relate generally to a method, a device and a computer program product for determining an expected exceeding of a maximum allowed power consumption of a mobile electronic device, and to a mobile electronic device.

BACKGROUND

In mobile electronic devices, generally, there are limitations regarding the energy supply for the operation of the devices compared with devices which are supplied with energy from a powerful stationary network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

For a user of a mobile electronic device it would be desirable to have an information about as to with which performance of the device various functions could be executed in parallel. By way of example, this would be useful as a help for deciding which functions the user allows to be executed by the device in which situation.

Modern mobile electronic devices or systems such as e.g. notebook PCs, personal digital assistants (PDA), communication devices, e.g. cellular phones, media player, and navigation devices include more and more functions and capabilities. By way of example, a plurality of processors is often integrated, which can process certain processes and jobs, so-called tasks, respectively. To some extent, a plurality of processes, e.g. a plurality of software applications, are also processed on one processor in parallel. Independent from the respective hardware implementation, a trend can be observed towards the parallel executability of various applications. Possible applications relate e.g. to speech, video, music, graphics, games, photos, television, or data transfer. The diverseness and the large number of the available applications result in a wide spread in the power consumption of a mobile device or system and thus to very different system behaviors depending on the applications to be executed.

Mobile electronic devices often include one processor or a plurality of processors or microprocessors (including e.g. complex instruction set computer (CISC) processors and reduced instruction set computer (RISC) processors). Processes, i.e. executable (software) programs, can be executed by these processors in the technical sense or processor circuits. Illustratively, it may be described that a process is running on a processor. In other words, an instance of the executable process is executed by the processor. A plurality of instances of a process may also be executed in parallel, i.e. an executable process may be executed multiple times in parallel in the form of a plurality of actually executed similar processes. By way of example, a word processing program may be started a plurality of times on a notebook PC and a plurality of different documents or also initially same copies of a document can be processed in parallel by means of the plurality of instances of the word processing program.

The complete execution of a process often further relates to periphery circuits, which also consume power. Furthermore, subtasks may be transferred to auxiliary circuits outside a processor in the narrower sense, e.g. a data transfer may be transferred to a controller circuit for DMA (direct memory access). It is intended that also the possible cooperation of peripheral or additional circuits within the execution of a process is included in case that this application describes a process which is executable by a processor or is processed by a processor.

Furthermore, it is intended that in this application a processor may also be understood as a technical group of processors including a plurality of processors, which can commonly execute or do commonly execute a process in a cooperative manner by means of distributed parallel processing, as it may be the case e.g. in multi-kernel systems. A device may also include a plurality of such processor groups. A process may include a group of a plurality or multiplicity of single processes, e.g. in case that subtasks are distributed to subprocesses. Furthermore, it is intended that the term "process" may also be understood as a group of processes.

A mobile electronic device may be supplied with energy for the operation of the device e.g. by means of a battery, accumulator, solar cell, mechanically generated energy and in the future in particular also by means of a high-performance capacitor (so-called Power-Caps) or by means of a fuel cell or a miniature fuel cell. A combination of these or other mobile energy types is also possible. A mobile electronic device may have a certain energy reservoir available or may carry it with it. During the operation, the reservoir may be consumed little by little and may be re-filled from time to time. Dependent on the used techniques and the constructive implementation, the withdrawal or the filling up of the energy reservoir may take place more or less fast or may be subject to limitations.

From the point of view of a user, it is eligible that his individual requirements are taken into consideration in order to achieve a benefit for the user that is as high as possible. Available different applications with different power consumptions lead to very different possible operation times underlying a certain available energy reservoir and possibly to collisions between applications. The user should be able to specify his priorities. Then, he could e.g. decide to complete the download of a file and abandon 15 minute video replay in view of the little remaining energy existing in an accumulator, in case that both in parallel is not possible with the existing residual energy. An information about the performance with which the device can execute different functions in parallel serves as a basis for such a decision. This releases the user from considerations in detail and selection options are made transparent.

In addition to this it is possible that not all of the applications which are available as such can run completely in parallel or are allowed to run completely in parallel in mobile electronic devices. This may be the case e.g. due to reasons of the limited maximum current consumption or power consumption of the device itself or due to characteristics of the techniques used for the mobile energy storage or energy conversion limiting the power consumption. In case that a maximum allowed power consumption of a mobile electronic device would be exceeded, automatic arbitration methods can produce relief only in a limited manner, since decisions about the deceleration or suspension of applications have a direct impact on the result for the user. The user requires information which assist him in the finding of the decision for a reasonable selection. An information about the performance with which the device can execute different functions in parallel serves for this purpose. Thus, the user is released from considerations in detail and selection options are made transparent.

Embodiments of the invention, which are described in the following in the context of the method for determining an expected residual operating time of a mobile electronic device analogously hold true also for the device and the computer program product for determining an expected residual operating time of a mobile electronic device.

Figure 1:
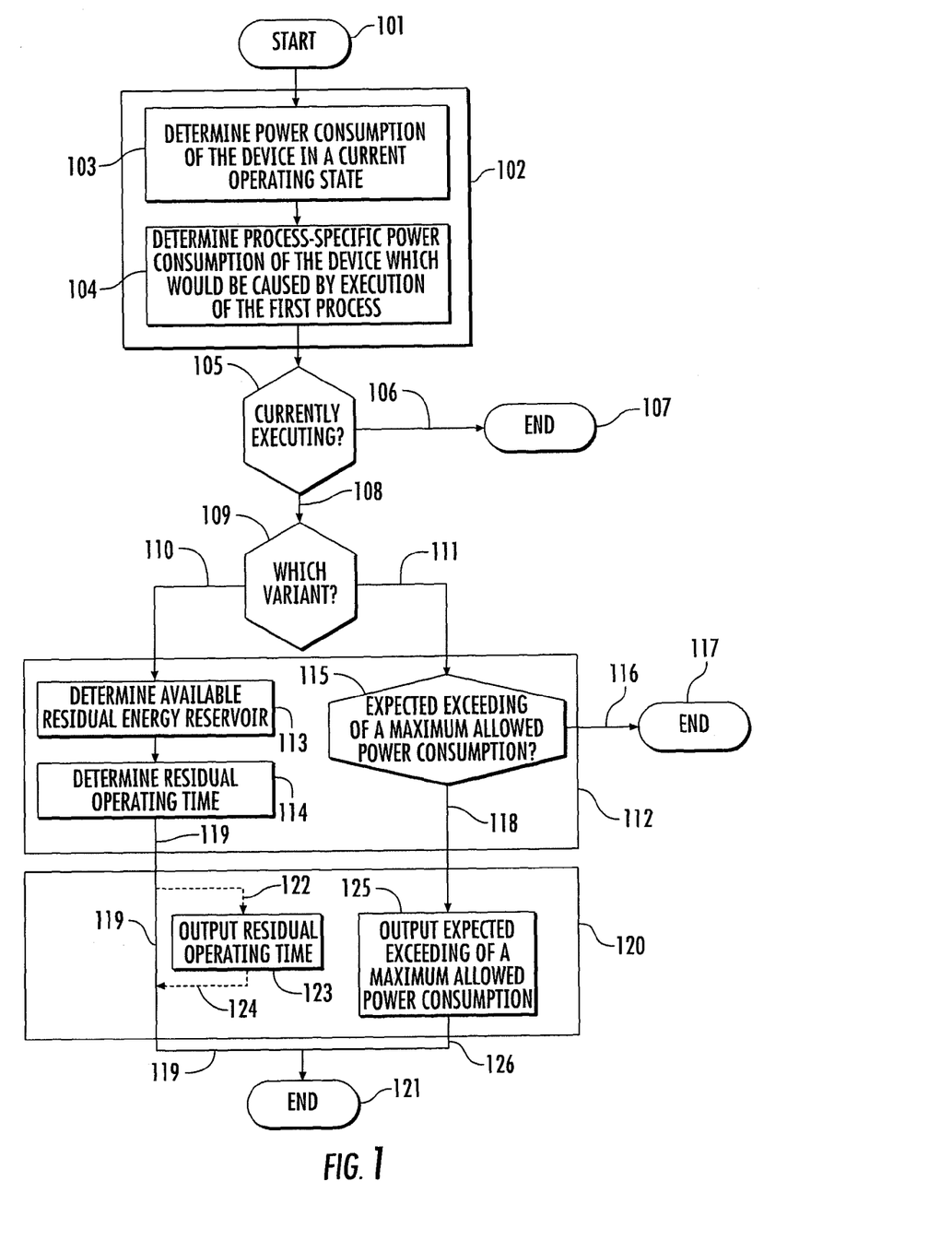
FIG. 1 shows a flow diagram of a method in accordance with an embodiment of the invention.

Referring now to FIG. 1 a flow diagram of a method in accordance with an embodiment of the invention will be described in more detail below. In the flow diagram shown in FIG. 1, a rectangle symbolizes a state or process, a rounded rectangle symbolizes a starting point or an end point of the procedure, and a rhombus symbolizes a node as a decision point with a plurality of possible paths for the continuation of the flow. Paths are symbolized by means of arrows.

The procedure starts with the starting point "Start" 101. Subsequently, the process "Determine power consumption" 102 is carried out. The process 102 includes the processes 103 and 104. In process 103, the power consumption of the device in the current operating state is determined, and in process 104, for at least one executable process, the process-specific power consumption of the device is determined, which would be caused by the execution of this process. For the preparation of the process 102, a table having data for the typical power consumption of processes or applications may be stored. The power consumption, which is caused by the execution of processes or applications may vary over time or due to different boundary conditions. Therefore, it may be appropriate to use a typical power consumption for the determination. A typical power consumption may be understood as being e.g. an average value over time of the power consumption or an average value over a multiple execution of the application or an estimated value for the power consumption of the application. The power consumption in the current operating state may be determined as the sum of the typical power consumptions of the currently running applications. To do this, a table having currently running applications may be prepared and may be read at the time of the determination of the power consumption.

In node 105, it is requested as to whether a first executable process, for which a process-specific power consumption has been determined in process 104, is currently not executed. In case that the first executable process is currently executed, the method is terminated with the end point "End" 107 via the path 106. In case that the first executable process is currently not executed, the method is continued with node 109 via the path 108. This is e.g. the case if a demand or request of a user is existent to start a new application, i.e. to start an application, which is currently not executed, and this new application is the first executable process. It is possible that an already executed application should additionally be started again, i.e. in another instance. The request in node 105 may relate to that the first executable process is a further instance of an application to be newly started, and as to whether this further instance is currently executed or not.

In node 109, it is decided as to which variant of the method in accordance with the embodiment of the invention should be executed. If it is decided that an expected residual operating time should be determined, the method is continued with the process 112 via the path 110. If it is decided that an expected exceeding of a maximum allowed power consumption should be determined, the method is continued with the process 112 via the path 111. In accordance with another embodiment of the invention, the both variants of the method corresponding to the paths 110 and 111 may also be executed in parallel. In this case, in one single method cycle, an expected residual operating time as well as an expected exceeding of a maximum allowed power consumption are determined.

The process "Determine energy consumption information" 112 includes the determination of an expected residual operating time if it is reached via the path 110 or the determination of an expected exceeding of a maximum allowed power consumption if it is reached via the path 111, depending on the method variant.

The path 110 leads to the process 113, in which an available residual energy reservoir is determined. This may e.g. be the determination of the remaining energy in a battery or in an accumulator. After the completion of the process 113, the method is continued with the process 114, in which an expected residual operating time is determined. The expected residual operating time may be the residual run duration of a requested new application. The residual run duration of a requested new application is calculated as the residual energy divided by the sum of two terms, wherein the first term is the typical power consumption of the new application and the second term is the determined power consumption in the current operating state.

Optionally, the maximum residual run duration of the requested application may be calculated, which is possible, if other applications, which are not required, are terminated. The mentioned second term in the calculation then represents the power consumption in the current operating state reduced by the sums of the typical power consumptions of those applications, which should not be further executed. Furthermore, optionally, the share of a plurality or of all currently running applications of the entire power consumption may be calculated. This may serve as a decision help for deciding at which applications it should preferentially be checked as to whether it could be terminated as an application that is currently not required. After the process 114 has been completed, the method is continued with the path 119.

The path 111 leads to the node 115, in which it is decided as to whether an expected exceeding of a maximum allowed power consumption when executing the first executable process would occur. This allowed maximum value may in this case be set in advance by device characteristics, operating conditions, the type of energy source, and so on, or it may also be predetermined e.g. by a user. An excess of the power threshold exists if the current power consumption, e.g. calculated as sum of the typical power consumptions of all currently running applications, plus the typical power consumption of a requested new application would be greater than the power threshold. In case it has been decided that no excess of a maximum allowed power consumption would occur, the flow will be continued with the end point "End" 117 via the path 116. In case it has been decided that an excess of a maximum allowed power consumption would occur, the method will be continued with the path 118.

The paths 118 and 119 both lead to the process "Output energy consumption information" 120. The process 120 may include different process flows, depending on whether it has been reached via the path 118 or via the path 119.

Path 119 leads further to the end point "End" 121 without an action in process 120 being necessary. Optionally, the process flow may be continued via path 122 branching off path 119, which path 122 leads to the process 123. In process 123, the residual operating time determined in process 114 may be output. By way of example, a graphic window may open, in which the residual run duration is shown, when a user directs a shown mouse pointer or cursor on a display (display unit) onto a symbol representation which is assigned to the new application requested by him. Optionally, a longer residual run duration may be shown, which may be achieved if applications which are not absolutely required are terminated. Further optionally, the shares of running applications of the current power consumption may be displayed. This may serve as a decision assistance as to which application should possibly be suspended in order to increase the residual run duration. It is further optionally possible to continuously update the mentioned residual run durations and display them quasi-statically together with the available applications, for example as a part of the application symbol. After having completed process 123, the method is continued via the path 124 which flows into the path 119.

Path 118 leads to the process 125, in which an information about the expected exceeding of a maximum allowed power consumption is output. The outputting of an information about the expected exceeding supports the user with the decision as to how he wishes to further proceed. Optionally, the process-specific power consumptions of running applications may be output. Furthermore, the deficiency, which is calculated as the current power consumption of the device plus process-specific power consumption of the requested new application minus power threshold, may be output. Furthermore, optionally, those applications may be highlighted in the output information, the process-specific power consumption of which is greater than or equal to the deficiency, i.e. those single applications, the suspension of which alone would already be sufficient to make the required power budget available for the execution of the requested new application. After having completed process 125, the method is terminated in the end point "End" 121 via the path 126.

Figure 2:
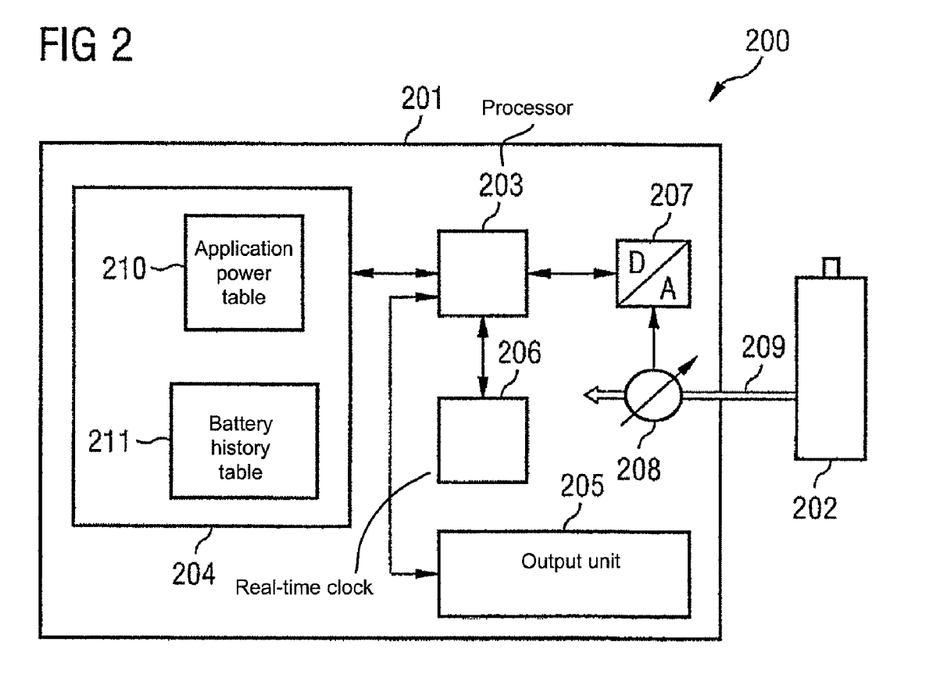
FIG. 2 shows a schematic representation of a device in accordance with an embodiment of the invention together with a battery.

Referring now to FIG. 2 a schematic representation of a device in accordance with an embodiment of the invention will be described in more detail below together with a battery 202.

The device 201 includes a processor 203, which is coupled with a memory 204, an output unit 205, a real-time clock 206 and an analog-digital-converter 207. Furthermore, the device 201 includes a measurement device 208, the measurement signals of which may be supplied to an analog input of the analog-digital-converter 207. The arrow 209, which leads from the battery 202 to the measurement device 208 and points beyond that, symbolizes the supply of energy from the battery 202 to operate an electronic device.

The memory 204 may be a non-volatile memory, e.g. a Flash memory or a harddisk. A table 210 which is stored in the memory 204 is an application-power-table. Data of typical power consumptions of applications are stored in the application-power-table. The processor 203 can determine the power consumption of currently executed as well as of currently not executed processes or applications by reading the table 210. Optionally, entries in the table 210 may be updated during the running of the respective application or may be adapted to the specific usage behavior of a certain user. This results in a self-learning system which improves the prediction precision for the user. The self-learn function may also be deactivatable again. The learning behavior of the table 210 may be settable in order to obtain a balanced prediction. Specifically, the maximum influence of a single power determination may be limited. By way of example, the table entry value may be changeable only by plus or minus 10 percent at maximum per application run or per measurement process carried out.

The power consumption of the device in the current operating state may be measured by means of the measurement device 208. The measurement device 208 measures current withdrawal and the voltage of the battery 202 at given time instants in response to a request of the processor 203. The measurement values are converted into digital values by means of the analog-digital-converter 207 and the digital values are supplied to the processor 203. In case that currently only one application is executed, the application-specific power consumption of the device for this application may thus be determined. A power consumption averaged over time is calculated by calculating the time integral of the product of voltage and current and by dividing the time integral by the integration time. A summation over a multiplicity of short time intervals may approximately be used instead of the integration. The closer meshed the time intervals are set, the more accurate the approximation will become. The time data of the time instants determining the time intervals may be determined by means of a real-time clock 206. The real-time clock 206 may be provided with a buffer battery or a buffer capacitor in order to ensure the accuracy of the measurement even in the case of inadequate or interrupted energy supply by the battery 202.

With a plurality of running applications, which do not start at the same time, or in case that power consumption contributions exist, which are not individually assigned to specific applications, i.e. in case that e.g. a kind of a base load exists from operating system processes, the contribution of an application may be determined as a difference value. This means that it is determined as to how the power consumption changes if a certain application will be additionally executed or terminated, and the difference value will be interpreted as process-specific power consumption of this application.

The available residual energy reservoir, i.e. in this exemplary embodiment of the invention the residual energy in the battery 202, which may e.g. be a lithium ion accumulator, may be determined by means of a voltage measurement. Since the voltage of the battery 202 decreases if energy is withdrawn from it, the measured voltage is a measure for the available residual energy. In order to improve the accuracy of the determination of the residual battery energy, further parameters may be recorded and may be stored e.g. in the memory 204. The memory 204 includes a table 211 for this, which is a battery history table. Data regarding the history of the loading and unloading processes of the battery are stored in the battery history table. By way of example, times, intensities of current, load voltages and degrees of unloading in the context of loading and unloading processes may be measured and recorded as parameters for the battery history. These data may be used in an empiric accumulator model in order to correct and improve the residual energy determination which is based on the voltage measurement. To initialize the method it may be possible to input basic data, which refer to factory new batteris, into the system when changing the battery or the accumulator.

The determination of an expected residual operating time and the determination as to whether an expected exceeding of a maximum allowed power consumption would occur, may be carried out by means of a corresponding software, which is executed by the processor 203, as has been described in the elucidation with reference to FIG. 1. The processor 203 may generate an energy consumption information which may be output by means of the output unit 205. An information about a determined residual operating time or about an expected exceeding of a maximum allowed power consumption is provided to a user.

Figure 3:
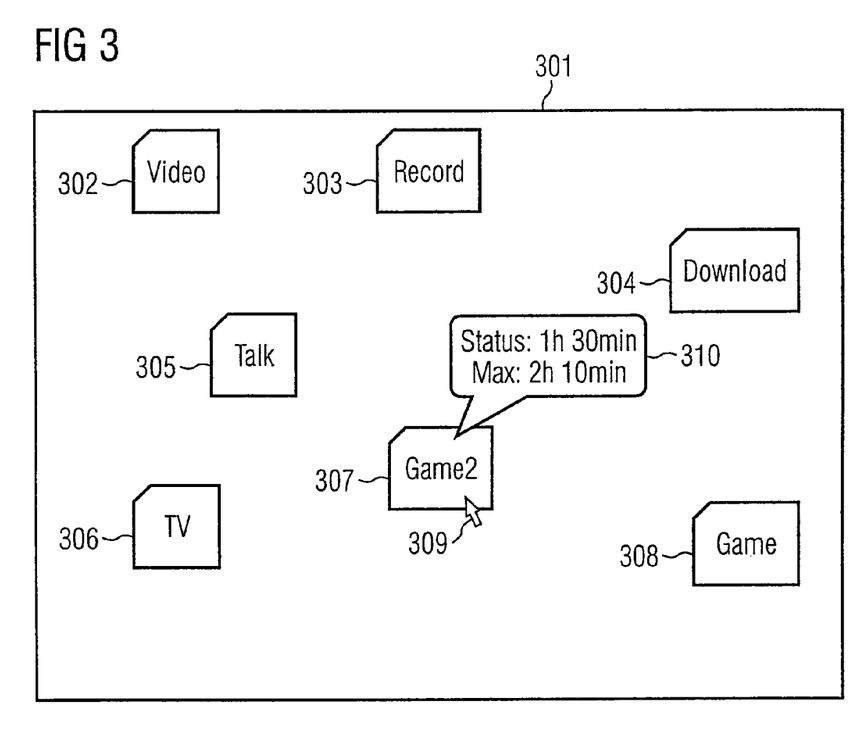
FIG. 3 shows a schematic representation of a visually output information in accordance with an embodiment of the invention.

Referring now to FIG. 3, a schematic representation of a visually output information in accordance with an embodiment of the invention will be described in more detail below.

A plurality of symbols for applications, which are available for a user, are displayed within a display window 301 of an output unit. In this example, these are the applications "video" 302, "Record" 303, "Download" 304, "Talk" 305, "TV" 306, "Game2" 307 and "Game" 308. As soon as the user points to one of the application symbols by means of a mouse pointer or cursor 309, a so-called pop-up window (popping up graphic window) 310 opens including energy consumption information assigned to the respective application. An expected residual operating time is output in the pop-up window 310 under the designation "Status", in the shown case 1 hour and 30 minutes, which is to be expected in case that the respective application "Game2" would be executed in addition and in case that all currently running applications would also further be executed. A maximum residual run duration is output under the designation "Max", in the illustrated case 2 hours and 10 minutes, in case that this application would be executed and in case that all other applications which are currently executed, would no longer be executed.

Optionally, an output of a list of applications in a window, which is not shown here, is possible, wherein the shares of these applications of the current entire power consumption are listed in this window. In this list, applications may be highlighted, e.g. by the user, which are exeeceuted but which do no longer be necessarily executed. A residual operating time may be output for the case that an application being highlighted as being requested should be executed, and that other applications being highlighted as no longer being required but currently running would no longer be executed.

Figure 4A:
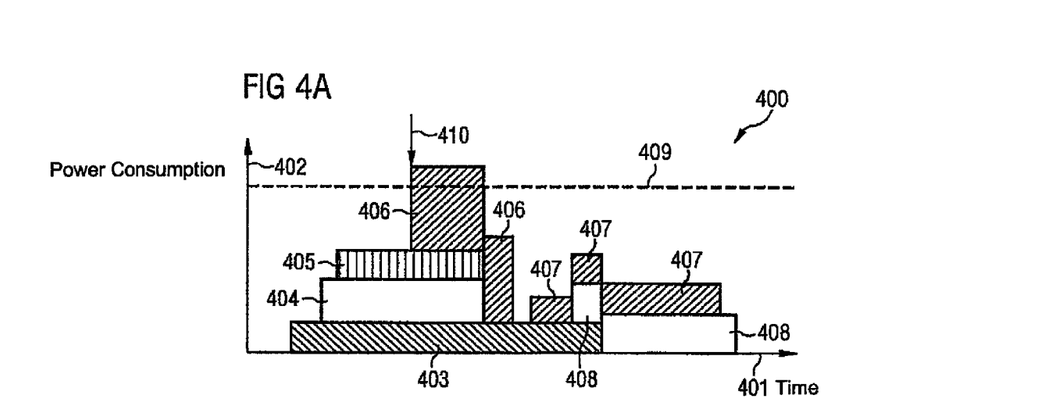
FIG. 4A shows an exemplary chronological sequence of the power consumption in the case of the determining of an expected exceeding of a threshold in accordance with an embodiment of the invention.

Referring now to FIG. 4A, an exemplary chronological sequence of the power consumption in the case of the determining of an expected exceeding of a threshold in accordance with an embodiment of the invention, and referring to FIG. 4B, a modified chronological sequence without exceeding the threshold will be described in more detail below.

The power consumption of the device caused by the parallel execution of different changing applications is shown in the diagram 400 using a time axis 401 and a power consumption axis 402. Exemplarily illustrated applications are a music replay 403, a game 404, a first data transfer 405, a second data transfer 406, a television replay 407 and a video recording 408. The dashed line 409 designates a threshold for a maximum allowed power consumption which may be given e.g. by the maximum current of a voltage supply regulator, the dimensioning of the supply lines or the permissible power dissipation. Due to this threshold, generally, not all applications which are available as such can be executed in parallel.

Figure 4B:
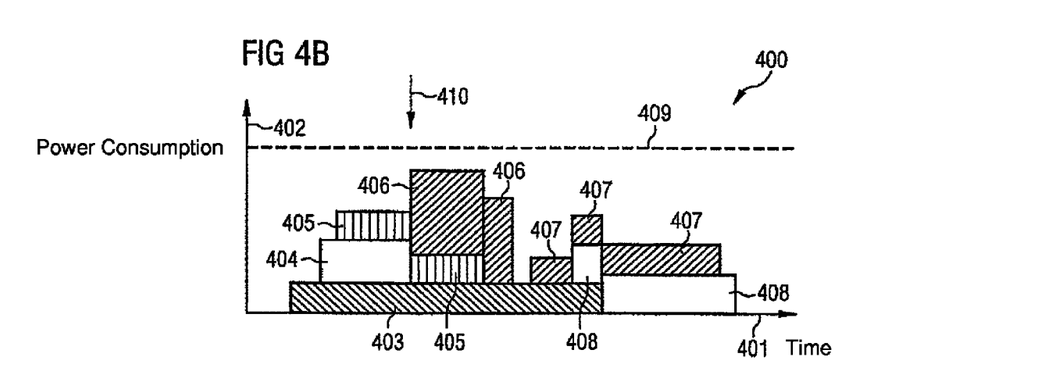
FIG. 4B shows a chronological sequence which is modified compared with FIG. 4A without exceeding the threshold in accordance with an embodiment of the invention.

FIG. 4B shows that at a certain time instant, at which the second data transfer 406 should be started, the threshold according to line 409 would be exceeded. The arrow 410 symbolizes a point of decision for a required prioritization decision. The combination of the applications 403, 404, 405, and 406, graphically shown in FIG. 4A, cannot occur without exceeding the threshold according to line 409.

A possible decision of a user could be to terminate the game 404 at the time instant highlighted by the arrow 410. The thus resulting changed chronological sequence of the power consumption is recorded in FIG. 4B. The combination of the applications 403, 405, and 406 is possible without exceeding the threshold according to line 409.

In an embodiment of the invention, a method for determining an expected exceeding of a maximum allowed power consumption of a mobile electronic device is provided. The method may include determining the power consumption of the device in the current operating state, determining, for a first process executable by a processor of the device, the process-specific power consumption of the device which would be caused by the execution of this process, determining as to whether an expected exceeding of a maximum allowed power consumption would occur for the case that a new instance of the first executable process would be executed, which is currently not executed, and that possible present instances of the first executable process, which are currently executed, are continued to be executed, and in case that it has been determined that an expected exceeding of a maximum allowed power consumption would occur, outputting an information about the expected exceeding of the maximum allowed power consumption.

Furthermore, in another embodiment of the invention, a device for determining an expected exceeding of a maximum allowed power consumption of a mobile electronic device is provided, wherein the device may include a power consumption determination circuit configured to determine the power consumption of the device in the current operating state, and to determine the process-specific power consumption of the device which would be caused by the execution of a first process executable by a processor of the device. The device may further include a power consumption comparing circuit configured to determine as to whether an expected exceeding of a maximum allowed power consumption would occur for the case that a new instance of the first executable process would be executed, which is currently not executed, and that possible present instances of the first executable process, which are currently executed, are continued to be executed, and an outputting circuit configured to output in case that it has been determined that an expected exceeding of a maximum allowed power consumption would occur, an information about the expected exceeding of the maximum allowed power consumption.

In yet another embodiment of the invention, a mobile electronic device is provided which includes a processor and a device for determining an expected exceeding of a maximum allowed power consumption of the mobile electronic device. The device for determining an expected exceeding of a maximum allowed power consumption of the mobile electronic device may include a power consumption determination circuit configured to determine the power consumption of the device in the current operating state, and to determine the process-specific power consumption of the device which would be caused by the execution of a first process executable by a processor of the device, a power consumption comparing circuit configured to determine as to whether an expected exceeding of a maximum allowed power consumption would occur for the case that a new instance of the first executable process would be executed, which is currently not executed, and that possible present instances of the first executable process, which are currently executed, are continued to be executed, and an outputting circuit configured to output in case that it has been determined that an expected exceeding of a maximum allowed power consumption would occur, an information about the expected exceeding of the maximum allowed power consumption.

In yet another embodiment of the invention, a computer program product for determining an expected exceeding of a maximum allowed power consumption of a mobile electronic device, wherein, in case the computer program product would be executed by a processor, a method would be executed, which includes determining the power consumption of the device in the current operating state, determining, for a first process executable by a processor of the device, the process-specific power consumption of the device which would be caused by the execution of this process, determining as to whether an expected exceeding of a maximum allowed power consumption would occur for the case that a new instance of the first executable process would be executed, which is currently not executed, and that possible present instances of the first executable process, which are currently executed, are continued to be executed, and in case that it has been determined that an expected exceeding of a maximum allowed power consumption would occur, outputting an information about the expected exceeding of the maximum allowed power consumption.

In an embodiment of the invention, it may be provided that in case that the first executable process currently is not executed, it is determined as to whether the expected exceeding of a maximum allowed power consumption would occur in case that the first executable process would be executed.

In accordance with an embodiment of the invention, an information designative for the first executable process may be output associated with the information about the expected exceeding of the maximum allowed power consumption.

In accordance with various embodiments of the invention, the respective process-specific power consumption of the device for one or more further executable processes may be determined.

In accordance with an embodiment of the invention, a power consumption of the device in the current operating state may be determined as the sum of the process-specific power consumptions of a plurality of processes which are currently executed by one ore more processors of the device.

In accordance with various embodiments of the invention, the deficiency, by which the maximum allowed power consumption would be exceeded, and the process-specific power consumption of at least one process, which is currently executed by a processor of the device, may be output associated with the information about the expected exceeding of the maximum allowed power consumption.

In accordance with various embodiments of the invention, a process or a group of processes may be determined for which the following holds true: the process or the group of processes are currently executed by the one or more processors of the device and the expected exceeding of the maximum allowed power consumption would not occur in the case that the new instance of the first executable would be executed and that the process or the group of processes would not be further executed.

In accordance with an embodiment of the invention, an information designative for the determined process or the determined group of processes may be output associated with the information about the expected exceeding of the maximum allowed power consumption.

In accordance with various embodiments of the invention, a process-specific power consumption may be determined for an executable process based on a typically caused by the execution of this process.

In accordance with various embodiments of the invention, a process-specific power consumption may be determined for an executable process taking into consideration a power consumption measured in executing the process.

In accordance with various embodiments of the invention, for at least one process, which is currently executed by a processor of the device, the portion of the process-specific power consumption of the power consumption of the device in the current operating state may be determined and output.

In accordance with various embodiments of the invention, the first executable process may be executable by the one processor of the device, and at least one process may be executable by another processor of the device.

In accordance with various embodiments of the invention, at least one process may be an application program and a user of the device can decide to start or to terminate the execution of the at least one application program. A plurality of processes or a multiplicity of processes may be assigned to an application.

In accordance with an embodiment of the invention, the first executable process may be an application program requested by the user of the device.

In accordance with various embodiments of the invention, the first executable process may be an application program available for the user of the device, and during the operation of the device it may be repeatedly determined as to whether the expected exceeding of the maximum allowed power consumption would occur in the case that the new instance of the first executable process would be executed.

In accordance with various embodiments of the invention, a residual energy reservoir available for the operation of the device may be determined and a first expected residual operating time may be determined which hold true for the case that the new instance of the first executable process would be executed and that the possible present instances of the first executable process would be continued to be executed.

In accordance with an embodiment of the invention, in case that the first executable process is currently not executed, the first expected residual operating time may be determined for the case that the first executable process would be executed.

In accordance with an embodiment of the invention, the determined first expected residual operating time may be output.

In accordance with an embodiment of the invention, an information designative for the first executable process may be output associated with the determined first expected residual operating time.

In accordance with an embodiment of the invention, a second expected residual operating time may be determined for the case that the new instance of the first executable process would be executed and that at least one process, which is currently executed by a processor of the device, would not be continued to be executed.

In accordance with an embodiment of the invention, it may be decided which processes which are currently executed by at least one processor of the device do no longer need to be continued to be executed, and the second expected residual operating time may be determined for the case that those currently executed processes for which it has been decided that they do no longer need to be continued to be executed, would not be continued to be executed.

In accordance with various embodiments of the invention, the determined second expected residual operating time may be output.

In accordance with an embodiment of the invention, an information designative for the first executable process may be output associated with the determined second expected residual operating time.

In accordance with an embodiment of the invention, the first executable process may be an application program available for the user of the device, and the first expected residual operating time may be repeatedly determined during the operation of the device.

In accordance with various embodiments of the invention, the mobile electronic device may be a mobile radio telephone. It may include a modem processor and an application processor.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for determining an expected exceeding of a maximum allowed power consumption of a mobile electronic device, the method comprising:
   determining power consumption of the device in a current operating state;
   determining, for a first process executable by a processor of the device, process-specific power consumption of the device which would be caused by execution of the first process;
   determining as to whether an expected exceeding of a maximum allowed power consumption would occur for a case in which a new instance of the first executable process would be executed, which is currently not executed, and that possible present instances of the first executable process, which are currently executed, are continued to be executed; and
   if it has been determined that an expected exceeding of a maximum allowed power consumption would occur, outputting information about the expected exceeding of the maximum allowed power consumption.

2. The method of claim 1, further comprising:
   outputting an information designative for the first executable process associated with the information about the expected exceeding of the maximum allowed power consumption.

3. The method of claim 1, further comprising:
   determining respective process-specific power consumption of the device for one or more further executable processes.

4. The method of claim 1, further comprising:
   determining the power consumption of the device in the current operating state as the sum of the process-specific power consumptions of a plurality of processes which are currently executed by one or more processors of the device.

5. The method of claim 3, further comprising:
   outputting the deficiency, by which the maximum allowed power consumption would be exceeded, and the process-specific power consumption of at least one process, which is currently executed by a processor of the device, associated with the information about the expected exceeding of the maximum allowed power consumption.

6. The method of claim 3, further comprising:
   determining a process or a group of processes for which it holds true that the process or the group of processes are currently executed by the one or more processors of the device and the expected exceeding of the maximum allowed power consumption would not occur in a case in which the new instance of the first executable would be executed and that the process or the group of processes would not be further executed.

7. The method of claim 6, further comprising:
   outputting an information designative for the determined process or the determined group of processes associated with the information about the expected exceeding of the maximum allowed power consumption.

8. The method of claim 1,
   wherein a process-specific power consumption is determined for an executable process based on a power consumption typically caused by the execution of the first process.

9. The method of claim 1,
   wherein a process-specific power consumption is determined for an executable process taking into consideration a power consumption measured in executing the process.

10. The method of claim 3, further comprising:
    determining and outputting for at least one process, which is currently executed by a processor of the device, the portion of the process-specific power consumption of the power consumption of the device in the current operating state.

11. The method of claim 3,
    wherein the first executable process is executable by the one processor of the device; and
    wherein at least one process is executable by another processor of the device.

12. The method of claim 1,
    wherein at least one process is an application program, and
    wherein a user of the device can decide to start or to terminate the execution of the at least one application program.

13. The method of claim 12,
    wherein the first executable process is an application program available for the user of the device, and
    wherein during the operation of the device it is repeatedly determined as to whether the expected exceeding of the maximum allowed power consumption would occur in a case in which the new instance of the first executable process would be executed.

14. The method of claim 1, further comprising:
    determining a residual energy reservoir available for the operation of the device; and
    determining a first expected residual operating time which holds true for a case in which the new instance of the first executable process would be executed and that the possible present instances of the first executable process would be continued to be executed.

15. The method of claim 14, further comprising:
outputting the determined first expected residual operating time.

16. The method of claim 15, further comprising:
outputting information designative for the first executable process associated with the determined first expected residual operating time.

17. The method of claim 14, further comprising:
determining a second expected residual operating time for a case in which the new instance of the first executable process would be executed and that at least one process, which is currently executed by a processor of the device, would not be continued to be executed.

18. The method of claim 17, further comprising:
deciding which processes which are currently executed by at least one processor of the device no longer need to be continued to be executed; and
determining the second expected residual operating time for a case in which those currently executed processes for which it has been decided that they no longer need to be continued to be executed, would not be continued to be executed.

19. The method of claim 17, further comprising:
outputting the determined second expected residual operating time.

20. The method of claim 19, further comprising:
outputting an information designative for the first executable process associated with the determined second expected residual operating time.

21. The method of claim 14,
wherein the first executable process is an application program available for the user of the device, and
wherein the first expected residual operating time is repeatedly determined during the operation of the device.

22. A device for determining an expected exceeding of a maximum allowed power consumption of a mobile electronic device, the device comprising:
a power consumption determination circuit configured to determine power consumption of the device in a current operating state, and to determine process-specific power consumption of the device which would be caused by execution of a first process executable by a processor of the device;
a power consumption comparing circuit configured to determine as to whether an expected exceeding of a maximum allowed power consumption would occur for a case in which a new instance of the first executable process would be executed, which is currently not executed, and that possible present instances of the first executable process, which are currently executed, are continued to be executed; and
an outputting circuit configured to output, if it has been determined that an expected exceeding of a maximum allowed power consumption would occur, information about the expected exceeding of the maximum allowed power consumption.

23. A mobile electronic device, comprising:
a processor; and
a device for determining an expected exceeding of a maximum allowed power consumption of the mobile electronic device, the device for determining an expected exceeding of a maximum allowed power consumption of the mobile electronic device comprising:
a power consumption determination circuit configured to determine a power consumption of the device in a current operating state, and to determine process-specific power consumption of the device which would be caused by the execution of a first process executable by a processor of the device;
a power consumption comparing circuit configured to determine as to whether an expected exceeding of a maximum allowed power consumption would occur for a case in which a new instance of the first executable process would be executed, which is currently not executed, and that possible present instances of the first executable process, which are currently executed, are continued to be executed; and
an outputting circuit configured to output, if it has been determined that an expected exceeding of a maximum allowed power consumption would occur, information about the expected exceeding of the maximum allowed power consumption.

24. A computer-readable program product storing program code for causing a computer to perform a method comprising:
determining power consumption of the device in a current operating state;
determining, for a first process executable by a processor of the device, process-specific power consumption of the device which would be caused by execution of the first process;
determining as to whether an expected exceeding of a maximum allowed power consumption would occur for a case in which a new instance of the first executable process would be executed, which is currently not executed, and that possible present instances of the first executable process, which are currently executed, are continued to be executed; and
if it has been determined that an expected exceeding of a maximum allowed power consumption would occur, outputting information about the expected exceeding of the maximum allowed power consumption.

25. A device for determining an expected exceeding of a maximum allowed power consumption of a mobile electronic device, the device comprising:
a power consumption determination means for determining power consumption of the device in a current operating state, and for determining process-specific power consumption of the device which would be caused by execution of a first process executable by a processor of the device;
a power consumption comparing means for determining as to whether an expected exceeding of a maximum allowed power consumption would occur for a case in which a new instance of the first executable process would be executed, which is currently not executed, and that possible present instances of the first executable process, which are currently executed, are continued to be executed; and
an outputting means for outputting if it has been determined that an expected exceeding of a maximum allowed power consumption would occur, information about the expected exceeding of the maximum allowed power consumption.

* * * * *